(12) United States Patent
Snover et al.

(10) Patent No.: US 7,802,089 B2
(45) Date of Patent: Sep. 21, 2010

(54) ANALYZING INTERPRETABLE CODE FOR HARM POTENTIAL

(75) Inventors: Jeffrey P. Snover, Woodinville, WA (US); Bruce Gordon Payette, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 11/339,397

(22) Filed: Jan. 25, 2006

(65) Prior Publication Data

US 2007/0180531 A1  Aug. 2, 2007

(51) Int. Cl.
H04L 29/06 (2006.01)
G06F 9/44 (2006.01)

(52) U.S. Cl. ............... 713/152; 717/115; 717/118; 717/139; 717/140; 726/22; 726/23; 726/25; 726/26

(58) Field of Classification Search ......... 713/164–167, 713/188, 153–154, 190; 717/115, 118, 122, 717/128, 139, 140; 726/22–25, 1; 709/249
See application file for complete search history.

(56) References Cited

U.S. PATENT DOCUMENTS

| 5,740,441 | A | * | 4/1998 | Yellin et al. | 717/134 |
| 5,983,348 | A | * | 11/1999 | Ji | 726/13 |
| 2002/0066024 | A1 | | 5/2002 | Schmall et al. | |
| 2002/0073330 | A1 | | 6/2002 | Chandnani et al. | |
| 2004/0073810 | A1 | * | 4/2004 | Dettinger et al. | 713/201 |
| 2004/0083383 | A1 | | 4/2004 | Carmona | |
| 2005/0283838 | A1 | | 12/2005 | Saito | |

OTHER PUBLICATIONS

"Product Focus: Behavior-Blocking Stops Unknown Malicious Code"; Andrew Conry-Murray, Network Magazine, Jun. 5, 2002.*
"It's time to Rethink your Corporate Malware Strategy"; Nick Del Grosso, GSEC Practical Assignment v1.3; Feb. 24, 2002.*
Auslender, Andres, "Insider Threat Detector, an integral approach to discover malicious source code", MSC Thesis, Department of Computer and System Sciences, Stockholm's University/Royal Institute of Technology, 2005. http://www.dsv.su.se/research/seclab/pages/pdf-files/2005-x-208.pdf.
Compilers Principles, Techniques, and Tool: Alfred V. Aho, Ravi Sethi, Jeffrey D. Ullman.
David Evans et al., "Splint Manual Version 3.1.1.1-1" Jun. 5, 2003, Programming Group, University of Virginia Department of Computer Science, Virginia, USA, XP007908263, Retrieved from the Internet: <http://www.splint.org/downloads/manual.pdf> on Apr. 20, 2009.
"Flawfinder Man Page" May 30, 2004, XP007908262, Retrieved from the Internet: http://www.dwheeler.com/flawfinder/flawfinder.pdf> 9 pages.

* cited by examiner

Primary Examiner—Taghi T Arani
Assistant Examiner—Mohammad L Rahman
(74) Attorney, Agent, or Firm—Workman Nydegger

(57) ABSTRACT

Computerized facilitation of an assessment of risk associated with running interpretable code. The interpretable code under evaluation is parsed to identify a command unit within the interpretable code. One or more risk factors associated with the identified command unit is then identified using the parsed code. A report is then made of including identification of the command unit found the interpretable code along with the identified associated one or more risk factors. Thus, a user need not have to read and evaluate the interpretable code itself, but may instead review the much less complex report to evaluate the risks associated with running the interpretable code.

18 Claims, 3 Drawing Sheets

ANALYZING INTERPRETABLE CODE FOR HARM POTENTIAL

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory or in storage, and that can be accessed and executed by the processor(s) to direct the overall functionality of the computing system. Thus, software is critical in enabling and directing the functionality of the computing system.

In order to construct software, a human being programmer first writes code that conforms to a programming language that contains syntax and semantics that are human readable and intuitive to a human being. Such code is referred to as "source code". While the source code is intuitive for a programmer that is properly educated on the programming language followed by the source code, the source code is not directly understood by the processors of the computing system. Instead, the source code must be transformed into computer-executable instructions that are directly executable by the processor(s) in a manner that the execution causes the processor(s) to direct the functionality specified in the source code.

In the case of interpretable code such as script or interpretable binary, this transformation is accomplished at run-time using a component referred to as an "interpreter". The use of interpretable code is widespread and is an important element of most Information Technology (IT) operations. For instance, if a certain fix is required, a script or other interpretable code may be generated to accomplish the fix. Scripts can be easily generated by anyone familiar with the script language. This has resulted in a large number of scripts being widely available for distribution and use.

Often, the script is published along with a description of what the script accomplishes. Unfortunately, the script may perform harmful functionality instead of and/or in addition to the advertised functionality. Since script is so easily generated and widely distributed, prudence warrants the careful consideration of whether or not the script has harmful effects either inadvertently or even maliciously caused by the scripts' authors. Thus, it is important to examine the script itself to understand what the script does before running the script.

However, there are many who are not able to evaluate the script to identify any harmful actions. Even for those familiar with the scripting language, it does take time to read through the script to find any potentially harmful actions since script can be thousands of lines long. Furthermore, those intending to do harm through a harmful script may occlude the harmful code in a manner that even skilled viewers may not even be able to find the harmful code. Finally, the harmful code may be embedded within interpretable binary, which is not human-readable absent extraordinary efforts.

BRIEF SUMMARY

Embodiments of the present invention relate to a computerized facilitation of an assessment of risk associated with running interpretable code. The interpretable code under evaluation is parsed to identify a command unit within the interpretable code. One or more risk factors associated with the identified command unit is then identified using the parsed code. A report is then made of including identification of the command unit found in the interpretable code along with the identified associated one or more risk factors. Thus, a user need not have to read and evaluate the interpretable code itself, but may instead review the much less complex and more intuitive report to evaluate the risks associated with running the interpretable code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention extend to the computerized facilitation of an assessment of risk associated with running interpretable code. The interpretable code under evaluation is parsed to identify a command unit within the interpretable code. One or more risk factors associated with the identified command unit is then identified using the parsed code. A report is then made including identification of the command unit found in the interpretable code along with the identified associated one or more risk factors. First, an example computing system in which features of the present invention may operate will be described with respect to FIG. 1. Then, embodiments of the present invention will be described in further detail with respect to FIGS. 2 and 3.

Figure 1:
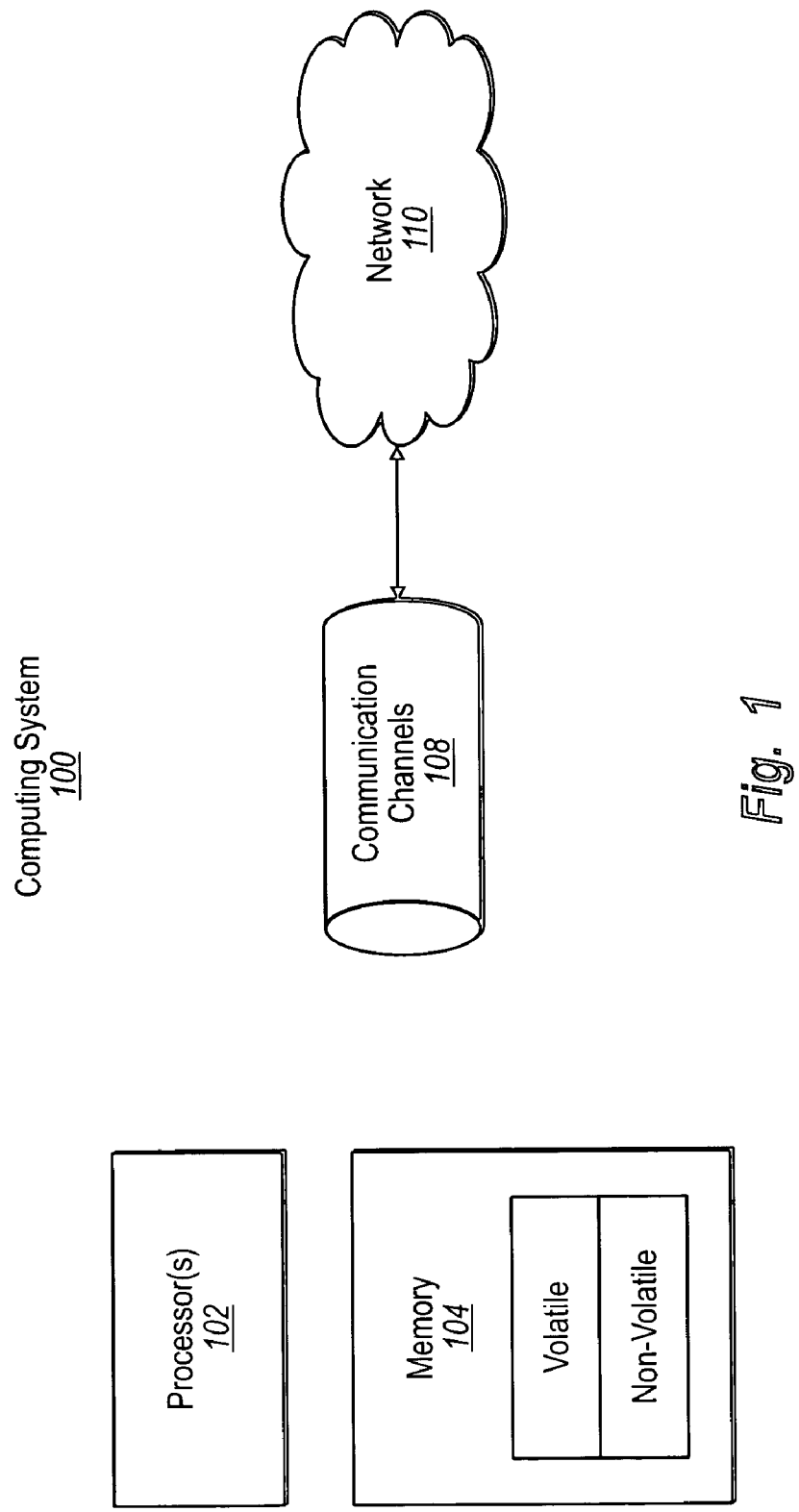
FIG. 1 schematically illustrates a suitable computing environment that may implement features of the present invention.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
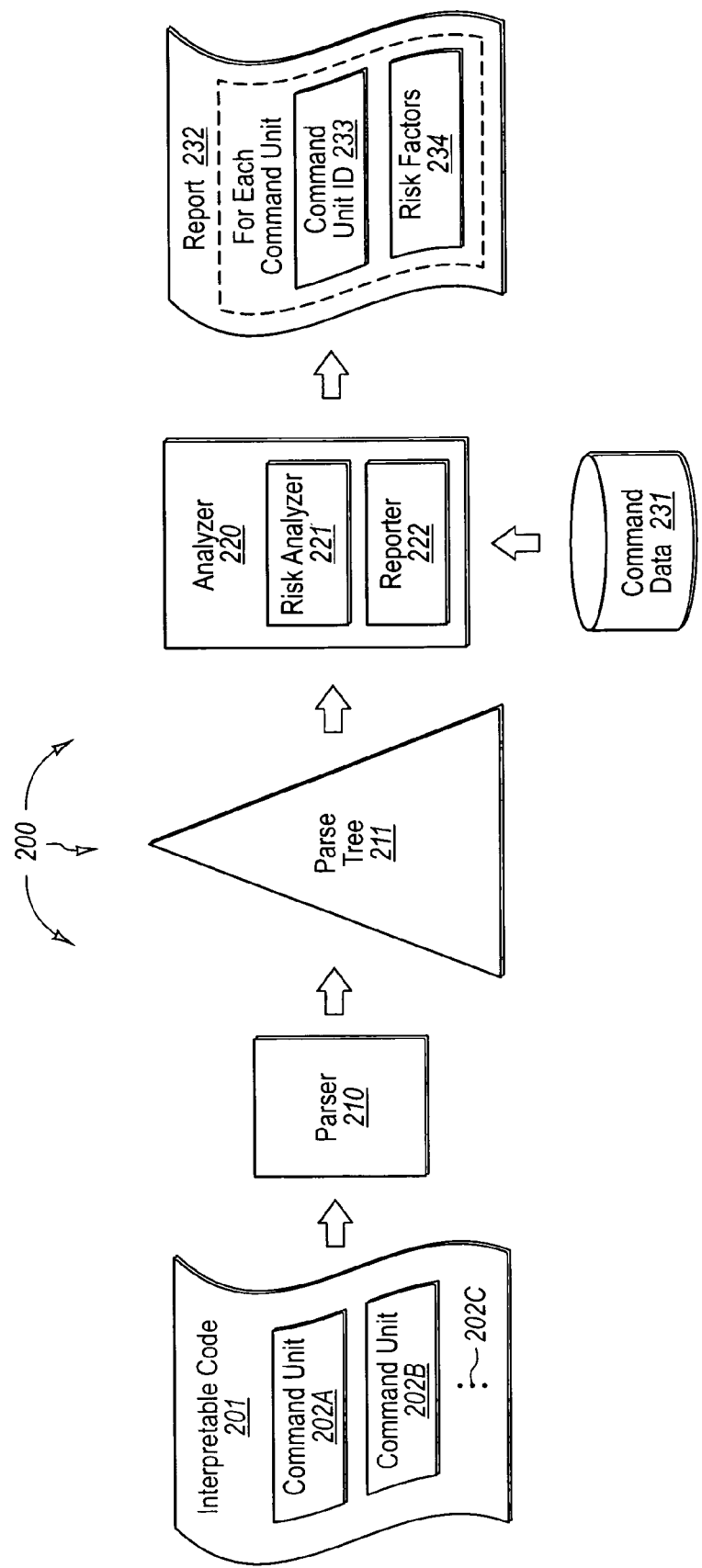
FIG. 2 schematically illustrates a processing flow in which various components operate to facilitate an assessment of risk associated with running interpretable code in accordance with one aspect of the principles of the present invention.

FIG. 2 illustrates a general process flow 200 in which various components operate to facilitate an assessment on risk associated with running interpretable code such as interpretable code 201. The interpretable code may include one or more command units. For instance, the interpretable code 201 of FIG. 2 is illustrated as including two command units 202A and 202B, although the interpretable code 201 may include other numbers of command units as well as represented by the ellipses 202C. In reality, interpretable code may include hundreds or even thousands of commands. However, the use of such a complex example may unnecessarily obscure the principles of the present invention. Accordingly, in the example of FIG. 2, the interpretable code is shown as including only two command units.

The interpretable code may be interpretable text code such as script, or may be interpretable non-text code. The command unit may be a single command with or without one or more associated parameters. For example, a command unit may include a single command to delete a file, with optionally a parameter representing the type of file to delete (e.g., text file, configuration file, executable file). Alternatively, the command unit may be a sequence of commands. For example, create file A, then delete file A might be one such sequence. Each command in the sequence may include one or more associated parameters.

Figure 3:
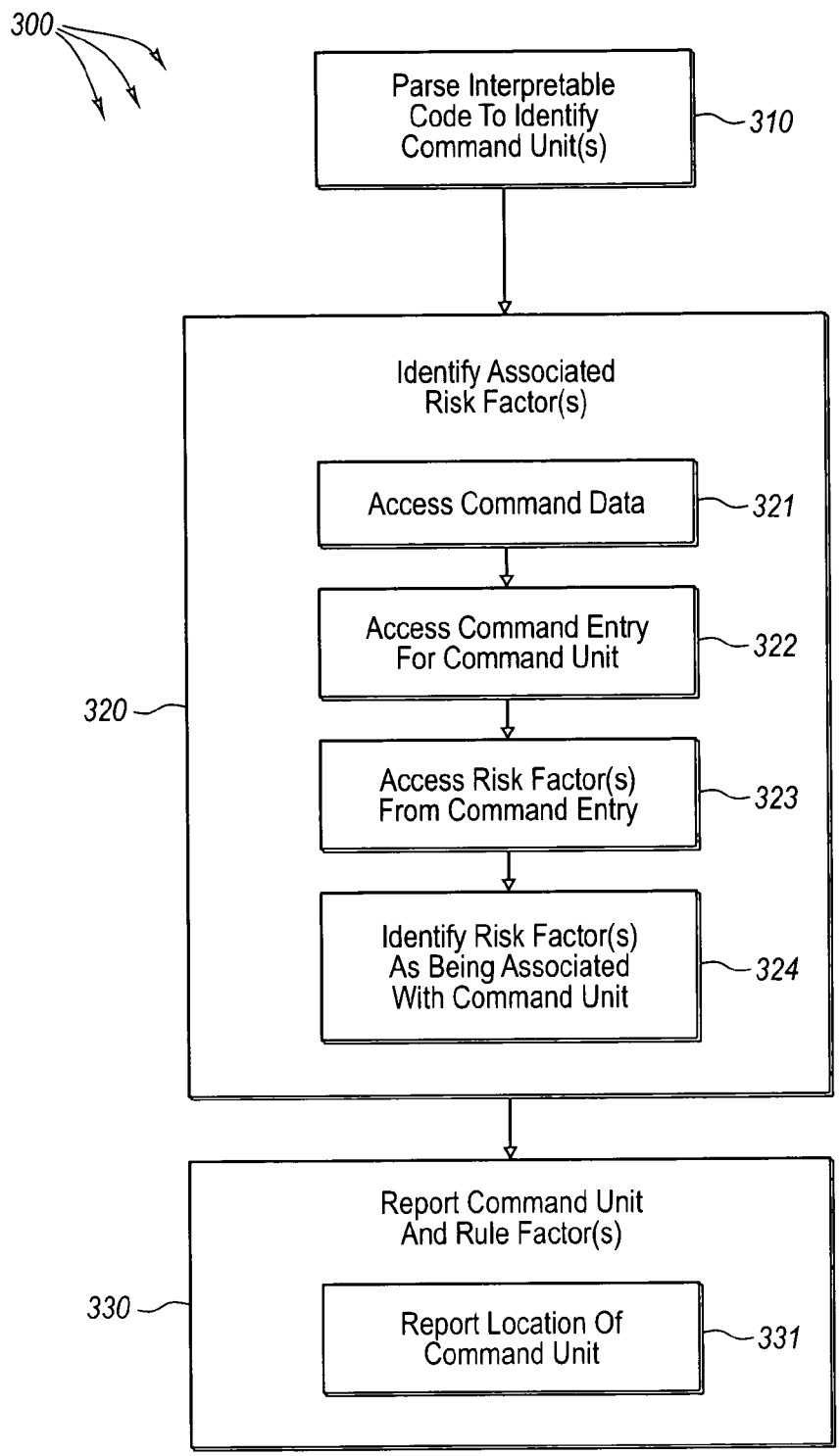
FIG. 3 illustrates a flowchart of a method for facilitating an assessment of risk associated with running interpretable code in accordance with one aspect of the principles of the present invention.

FIG. 3 illustrates a flowchart of a computer-implemented method 300 for facilitating an assessment of risk associated with running interpretable code. As the method 300 may be performed using the general processing flow 200 of FIG. 2, the remainder of FIG. 2 will now be described with frequent reference to FIG. 3.

A parsing component 210 receives and parses through the interpretable code to identify one or more command units within the interpretable code (act 310). When implemented in software, the parsing component 210 may be part of a computer program product. The computer program product may have one or more computer-readable media having thereon computer-executable instructions that, when executed by one or more processors of a computing system, cause the computing system to instantiate and operate the parsing component 210.

In one embodiment, the parsing component identifies the command units in a parse tree 211. Mechanisms for parsing through interpretable code to generate a parse tree are known in the art and thus will not be described in detail herein.

An analyzer 220 accesses the parse tree 211 to identify one or more command units. The analyzer 220 may also be part of the same computer program product as the parsing component 210 if implemented in software. Alternatively, the parsing component 210 and the analyzer 220 may be in different computer program products.

For each of at least one of the command units identified as being within the interpretable code 201, a risk analyzer component 221 of the analyzer 220 identifies one or more risk factors associated with the identified command unit using the parsed code (act 320). This may be accomplished by accessing command data 231 (act 321), accessing a command entry associated with the command unit in the command data (act 322), accessing one or more risk factors from the command entry (act 323), and identifying the one or more risk factors as being the one or more risk factors associated with the identified command unit (act 324). The risk factors may include a general category of the command unit, a functional description of the command unit and/or a level of risk associated with the command unit.

The analyzer 220 also includes a reporting component 222 for reporting an identification of the command unit found in the interpretable code along with the identified associated one or more risk factors (act 330). For instance, the reporting component 222 may generate report 232 which may include for each command unit and identification 233 of the command unit as well as the risk factor(s) 234 associated with the command unit. In addition, the reporting component 222 may report a location in the interpretable code in which the command unit appears (act 331).

The following is a specific example of a report that might be generated in accordance with the principles of the present invention:

Script foo.msh performs the following operations:
　　File Operations
　　Delete-File (occurs at lines: 5234, 3242)
　　Process Operations
　　Get-Process (occurs at lines: 55, 66, 88, 234)
　　Get-Service (occurs at lines: 934, 1235, 392)

Suppose that in this example, the script was advertised as a script for managing processes and services. In that context, the process operations "Get-Process" and "Get-Service" appear appropriate and more likely harmless. However, upon receiving this report, a user would likely want to know why the script performs the file operation "Delete-File". Accordingly, the user could go to the specified locations of the script (e.g., lines 5234 and 3242) to see if the other context of the script provides any light to a decision on whether the delete file operation is harmful. For instance, if the operation is to delete a pre-existing configuration file in the system, then that presents a higher likelihood that execution of the script will indeed result in some harm. On the other hand, if the script merely deletes a temporary file that the script itself previously created, then there would seem to be less likelihood of there being a problem.

In this example, there are three command units shown "Delete-File", "Get-Process", and "Get-Service", each command unit having only one command and no parameters. However, instead of "Delete-File", the report could have stated "Delete-File FileType:Executable". The parameter "FileType:Executable" may be relevant for the user in determining whether or not the script is harmful. The other commands could have had parameters reported as well. Furthermore, command units of a sequence of command may be reported. For instance, instead of reporting on just the occurrence of "Delete-File", the report could instead have reported on instances in which a file was created by "Create-File" followed by the file being deleted by "Delete-File", indicating that the file was created and deleted by the script, thereby implying less harm due to the delete operation. The risk factors in the above example may essentially be the categorization of the methods into for example "File Operations" and "Process Operations".

The following is another example of a report that might be generated:

Script foo.msh performs the following types of operations:
　　Very dangerous
　　Invoke-Command (occurs at lines 423, 64)
　　Dangerous
　　Delete-File (occurs at lines: 5234, 3242)
　　Probably Benign
　　Get-Process (occurs at lines: 55, 66, 88, 234)
　　Get-Service (occurs at lines: 934, 1235, 392)

In this case, the risk factors involve an actually preliminary estimate of the risk associated with the command. Of course, a user may arrive at a different final estimate of the risk after having reviewed the command in its context within the script.

Accordingly, the principles of the present invention presents a more intuitive alternative than having the user review the script code itself in order to make an evaluation on whether or not there is acceptably low risk of harm in executing script. Specifically, the user may instead simply review of more intuitive report that provides readable representations of risk factors associated with various commands provided in the script. Furthermore, the report may provide a representation of the location of the command in the script in case the user desires to perform a more detailed evaluation of the command's risk in light of the programming context.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computer system, the computer system being comprised of at least a processor and a memory source, for facilitating a user assessment of risk associated with running interpretable code, prior to executing the code, the method comprising:
　　prior to executing the interpretable code, an act of parsing the interpretable code to identify one or more command units within the interpretable code;
　　prior to executing the interpretable code, an act of identifying one or more risk factors associated with each identified command unit using the parsed code, the act of identifying one or more risk factors associated with each identified command unit being comprised of:
　　　　an act of accessing command data;

an act of accessing a command entry associated with the identified command unit in the command data;

an act of accessing one or more risk factors from the command entry; and an act of identifying the one or more risk factors as being the one or more risk factors associated with the identified command unit; and prior to executing the interpretable code, an act of generating a user-readable report that includes:

a listing of a plurality of categories, each category corresponding to one or more of the identified risk factors;

for each of the plurality of categories, a listing of one or more identified command units found in the interpretable code that are associated with the one or more identified risk factors that correspond to the category, wherein at least one identified command unit comprises a command with one or more associated parameters, and wherein the user-readable report further includes, for the listed command unit, one or more of the associated parameters; and for each listed command unit, an identification of one or more line number in the interpretable code on which the command unit appears.

2. A method implemented in accordance with claim 1, wherein the interpretable code is interpretable text code.

3. A method implemented in accordance with claim 1, wherein the interpretable code is interpretable non-text code.

4. A method implemented in accordance with claim 1, wherein at least one identified command unit includes a single command.

5. A method implemented in accordance with claim 1, wherein at least one identified command unit comprises a plurality of commands.

6. A method implemented in accordance with claim 5, wherein at least one of the plurality of commands has one or more associated parameters.

7. A method implemented in accordance with claim 1, wherein the one or more risk factors comprises a level of risk associated with the command unit.

8. A computer-readable storage device having stored thereon computer-executable instructions that, when executed by one or more processors of a computing system, cause the computing system to perform a method for facilitating a user assessment of risk associated with running interpretable code, prior to executing the code, the computer-executable instructions comprising:

a parsing component for interpreting interpretable code to identify one or more command units within the interpretable code;

a risk analyzer component for identifying one or more risk factors associated with each identified command unit using the parsed code;

a reporting component for categorically reporting an identification of each identified command unit found in the interpretable code along with the identified associated one or more risk factors; and computer-executable instructions which, when executed by the one or more processors, implement the method for facilitating the user assessment of risk, wherein the method includes:

prior to executing the interpretable code, the computing system parsing the interpretable code to identify the command unit within the interpretable code;

prior to executing the interpretable code, the computing system identifying the one or more risk factors associated with each identified command unit using the parsed code, the act of identifying one or more risk factors associated with each identified command unit being comprised of:

the computing system accessing command data;

the computing system accessing a command entry associated with the identified command unit in the command data;

the computing system accessing one or more risk factors from the command entry; and the computing system identifying the one or more risk factors as being the one or more risk factors associated with the identified command unit; and prior to executing the interpretable code, the computing system generating a user-readable report that includes:

a listing of a plurality of categories, each category corresponding to one or more of the identified risk factors;

for each of the plurality of categories, a listing of one or more identified command units found in the interpretable code that are associated with the one or more identified risk factors that correspond to the category, wherein at least one identified command unit comprises a command with one or more associated parameters, and wherein the user-readable report further includes, for the listed command unit, one or more of the associated parameters; and for each listed command unit, an identification of one or more line number in the interpretable code on which the command unit appears.

9. The computer-readable storage device in accordance with claim 8, wherein the one or more computer-readable storage media device comprise system memory.

10. The computer-readable storage device in accordance with claim 8, wherein the interpretable code is interpretable text code.

11. The computer-readable storage device in accordance with claim 8, wherein the interpretable code is interpretable non-text code.

12. The computer-readable storage device in accordance with claim 8, wherein at least one identified command unit includes a single command with or without one or more associated parameters.

13. The computer-readable storage device in accordance with claim 8, wherein at least one identified command unit comprises a plurality of commands.

14. A computing system comprising:

one or more processors; and a computer program product comprising one or more computer-readable storage device having thereon computer-executable instructions that, when executed by one or more processors of a computing system, cause the computing system to perform a method for facilitating a user assessment of risk associated with running interpretable code, prior to executing the code, the computer-executable instructions comprising:

a parsing component for interpreting interpretable code to identify one or more command units within the interpretable code;

a risk analyzer component for identifying one or more risk factors associated with each identified command unit using the parsed code;

a reporting component for categorically reporting an identification of each identified command unit found in the interpretable code along with the identified associated one or more risk factors; and computer-executable instructions which, when executed by the one or more processors, implement the method for facilitating the user assessment of risk, wherein the method includes:

prior to executing the interpretable code, the computing system parsing the interpretable code to identify the command unit within the interpretable code;

prior to executing the interpretable code, the computing system identifying the one or more risk factors associated with each identified command unit using the parsed code, the act of identifying one or more risk factors associated with each identified command unit being comprised of:

the computing system accessing command data;

the computing system accessing a command entry associated with the identified command unit in the command data;

the computing system accessing one or more risk factors from the command entry; and the computing system identifying the one or more risk factors as being the one or more risk factors associated with the identified command unit; and prior to executing the interpretable code, the computing system generating a user-readable report that includes:

a listing of a plurality of categories, each category corresponding to one or more of the identified risk factors;

for each of the plurality of categories, a listing of one or more identified command units found in the interpretable code that are associated with the one or more identified risk factors that correspond to the category, wherein at least one identified command unit comprises a command with one or more associated parameters, and wherein the user-readable report further includes, for the listed command unit, one or more of the associated parameters; and for each listed command unit, an identification of one or more line number in the interpretable code on which the command unit appears.

15. A computing system in accordance with claim 14, wherein the one or more computer-readable storage media are each physical storage and/or memory media.

16. A method implemented in accordance with claim 1, wherein the plurality of categories comprise general categories of the command units.

17. A method implemented in accordance with claim 1, wherein the plurality of categories comprise functional descriptions of the command units.

18. A method implemented in accordance with claim 1, wherein the plurality of categories comprise levels of risk associated with the command units.

* * * * *